(12) United States Patent
Kim

(10) Patent No.: US 8,826,811 B2
(45) Date of Patent: Sep. 9, 2014

(54) JUICER MODULE AND VERTICAL SCREW JUICER

(75) Inventor: Jong Boo Kim, Daegu (KR)

(73) Assignee: NUC Electronics Co., Ltd., Daegu (KR)

( * ) Notice: Subject to any disclaimer, the term of this patent is extended or adjusted under 35 U.S.C. 154(b) by 10 days.

(21) Appl. No.: 12/988,624

(22) PCT Filed: Aug. 24, 2010

(86) PCT No.: PCT/KR2010/005649
§ 371 (c)(1),
(2), (4) Date: Apr. 28, 2011

(87) PCT Pub. No.: WO2011/025227
PCT Pub. Date: Mar. 3, 2011

(65) Prior Publication Data
US 2012/0137899 A1 Jun. 7, 2012

(30) Foreign Application Priority Data

Aug. 28, 2009 (KR) .......... 10-2009-0080478
Nov. 24, 2009 (KR) .......... 10-2009-0113817
Aug. 12, 2010 (KR) .......... 10-2010-0077914

(51) Int. Cl.
*A23N 1/00* (2006.01)
*A47J 19/02* (2006.01)

(52) U.S. Cl.
CPC .................. *A47J 19/027* (2013.01)
USPC ............. 99/509; 99/502; 99/510; 99/511; 99/512; 100/117; 100/131; 100/145; 366/133; 366/186

(58) Field of Classification Search
CPC .......... A23N 1/00; A23N 1/02; A23N 1/003; A23N 3/00; A23N 3/02; A47J 19/00

USPC ............... 99/348, 495, 501, 502, 509–513; 241/24.11, 24.26, 74, 82.1, 260.1, 241/282.1; 100/117, 131, 145; 366/133, 366/157.3, 186, 194, 197, 249, 266, 318, 366/341

See application file for complete search history.

(56) References Cited

U.S. PATENT DOCUMENTS 1,906,054 A * 4/1933 Freese .................. 99/512
2,304,929 A 12/1942 Keith (Continued)

FOREIGN PATENT DOCUMENTS

JP 06-319505 11/1994
KR 20-1993-0012778 U 7/1993

(Continued)

OTHER PUBLICATIONS

International Search Report, mailed May 4, 2011, for PCT/KR2010/005649, 3 pages.

*Primary Examiner* — Dana Ross
*Assistant Examiner* — James Sims, III
(74) *Attorney, Agent, or Firm* — Seed IP Law Group PLLC

(57) ABSTRACT

A juicer module is disclosed herein. The juicer module includes an open top juicer container, a lid which is provided with a material input through a side of the lid and coupled to an upper portion of the juicer container, a net drum fixedly arranged within the juicer container and a screw arranged within the net drum. The screw is provided with a spiral portion formed on a side surface of the screw and a rotary shaft to pass through the shaft hole of the juicer container. The juicer module may further include a guide rotary portion formed on an upper end of the screw, and the lid may be provided with a rotary guide for guiding the rotation of the screw, the rotary guide being in contact with an edge of the guide rotary portion when the juicer module is assembled.

4 Claims, 8 Drawing Sheets

(56) References Cited

U.S. PATENT DOCUMENTS

| | | | |
|---|---|---|---|
| 4,440,074 A * | 4/1984 | Ihara et al. | 99/510 |
| 5,669,289 A * | 9/1997 | Chen | 99/511 |
| 5,906,154 A * | 5/1999 | Yoon et al. | 99/510 |
| 5,970,860 A * | 10/1999 | Yip | 99/510 |
| 6,604,455 B2 * | 8/2003 | Areh et al. | 99/510 |
| 6,637,323 B2 * | 10/2003 | Kim | 99/510 |
| 8,091,473 B2 | 1/2012 | Kim | |
| 2004/0231529 A1 | 11/2004 | Jan | |
| 2009/0049998 A1 * | 2/2009 | Kim | 99/510 |

FOREIGN PATENT DOCUMENTS

| | | | |
|---|---|---|---|
| KR | 10-1995-0000072 | B1 | 1/1995 |
| KR | 20-1995-0013027 | | 6/1995 |
| KR | 20-1996-0000061 | Y1 | 1/1996 |
| KR | 20-1996-0003085 | Y1 | 4/1996 |
| KR | 10-1996-0016782 | A | 6/1996 |
| KR | 20-1999-0016788 | | 5/1999 |
| KR | 10-2000-0074261 | A | 12/2000 |
| KR | 10-2001-0012045 | A | 2/2001 |
| KR | 10-0285120 | B1 | 3/2001 |
| KR | 10-2002-0059458 | B1 | 7/2002 |
| KR | 20-0322266 | | 7/2003 |
| KR | 20-0376615 | | 2/2005 |
| KR | 20-0392588 | Y1 | 8/2005 |
| KR | 10-2005-0101127 | A | 10/2005 |
| KR | 10-2006-0025924 | A | 3/2006 |
| KR | 10-0793852 | B1 | 9/2006 |
| KR | 10-0755440 | B1 | 9/2007 |
| KR | 10-0966607 | B1 | 6/2010 |
| KR | 10-2012-0029640 | A | 3/2012 |
| KR | 10-2012-0042606 | A | 5/2012 |

\* cited by examiner (a)

(b)

JUICER MODULE AND VERTICAL SCREW JUICER

BACKGROUND

1. Technical Field

The present disclosure relates to a juicer module, and more particularly, to a juicer module in which a screw connected to a driving shaft of a driving device is used to squeeze and/or mill vegetables, fruits, nuts, cereals, etc., thereby producing juices, vegetable juices or other juice-type foods.

2. Description of the Related Art

A juicer is a device for processing vegetables, fruits, etc. to produce fluid-typed or juice-typed foods. Various types of juicers which may be conveniently used for domestic or commercial applications have been known. Most universal juicers adopted a scheme in which a material is thrown into a material input and then milled by using a high-speed rotary blade. However, this type of juicer has typically been restricted to crushing tough materials such as green vegetables composed of stems or leaves to produce vegetable juices.

Accordingly, a juicer has been conventionally developed to squeeze vegetables and fruits between a rotary screw and a net drum, thereby producing juices or extracts (e.g., vegetable juices). In such a juicer, the screw and the net drum are arranged within an open top juicer container, and a lid in which a material input is formed is coupled with an upper portion of the juicer container. A shaft socket is formed in a lower portion of the lid, and a shaft which is inserted into the shaft socket in a rotatable manner is installed onto an upper end of the screw. The material input is configured to be small-sized in the lid without being overlapped with the shaft socket. The juicer container is mounted on a main body in which a driving device is embedded, and the screw is connected to a driving shaft of the driving device positioned outside the juicer module so that the screw may be rotated.

In the conventional juicer, only protruded spiral portions formed on a side surface of the screw take part in material processing schemes such as juice-squeezing and/or milling together with a juice-squeezing or milling net drum. Accordingly, in order that the material thrown through the material input may reach the spiral portions formed on the side surface of the screw, a considerable portion of the upper end of the screw has been removed.

Further, in the conventional juicer, water or moisture may be permeated through a location at which the driving shaft of the main body and a rotary shaft of the screw are connected with each other. As such, a cylindrical protrusion for waterproofing is typically formed around a central bottom portion of the juicer container which is connected to the driving shaft, and a seal is installed on an upper portion of the cylindrical protrusion. Further, a cylindrical depression is typically formed around the rotary shaft positioned on a lower portion of the screw so that the cylindrical protrusion is inserted into the cylindrical depression.

However, this type of conventional juicer has a disadvantage in that it is difficult to clean the surrounding of the cylindrical protrusion on the central bottom portion of the juicer container and the internal portion of the cylindrical depression on the lower portion of the screw. Since the juicer is a food processing device requiring extreme cleanness, this disadvantage is very critical. Further, in order to assemble the screw and the juicer container with each other, the protrusion on the central bottom portion of the juicer container must be smoothly inserted into the depression on the lower portion of the screw. For this, the dimension of the cylindrical depression is larger than that of the cylindrical protrusion. Still further, since the rotary shaft of the screw must be supported by a soft seal installed on the upper portion of the protrusion, the screw is maintained in a state in which the screw is fluctuated in a lateral direction when the screw is assembled to the bottom of the juicer container. Although the fluctuation of the screw may be prevented by inserting the shaft formed on the upper portion of the screw into the shaft socket formed in the lid according to the most popular scheme in the food processing field, there is another disadvantage in that the shaft socket formed in the lid may be broken under the unstable assembling condition of the screw. Further, it is very inconvenient to clean the shaft socket formed on the lid, and this is deemed to be a disadvantage for such a food processing device requiring sanitation.

BRIEF SUMMARY

Embodiments of the present invention address the aforementioned problems in the prior art.

According to an embodiment, a juicer module is provided in which the cylindrical protrusion and the cylindrical depression typical of a conventional juicer, which would otherwise be arranged on an inner bottom of the juicer container and in the lower portion of the screw, respectively, may be eliminated, thereby facilitating the cleaning of the juicer, resting the screw in a stationary manner on the inner bottom of the juicer container, and firmly preventing the moisture in the juicer container from being leaked outwards.

According to another embodiment, a juicer module is provided in which the shaft typical of a conventional juicer, which would otherwise be arranged on an upper end of the screw, as well as the shaft socket, which would otherwise be arranged in the lid and into which the shaft would be inserted, may be omitted, thereby further facilitating the cleaning of the lid.

According to another embodiment, a vertical screw juicer is provided comprising a locking structure which can prevent a vertical movement of the screw which would cause the deterioration or reduction of juicing efficiency.

According to one embodiment, there is provided a juicer module having an open top juicer container with a shaft hole formed in a bottom central portion of the juicer container and a bottom inclined surface slanting downwards and outwardly from the shaft hole; a lid with a material input through a side thereof, the lid being coupled to an upper portion of the juicer container; a net drum fixedly arranged within the juicer container; and a screw arranged within the net drum, the screw having a spiral portion formed on a side surface thereof and a rotary shaft to pass through the shaft hole of the juicer container.

According to one embodiment, a lower inclined surface at least partially formed on a lower end of the screw may be in contact with the bottom inclined surface of the juicer container.

According to another embodiment, a seal or packing into which the rotary shaft is inserted may be installed at a central portion of the bottom inclined surface of the juicer container, and the seal or packing may include an inclined surface extending from and parallel to the bottom inclined surface.

According to a further embodiment, a first inserting protrusion may be formed downwardly on one side of a lower end of the net drum, and at least one second inserting protrusion may be formed downwardly on the other side of the lower end of the net drum, and wherein an inserting hole into which the first inserting protrusion is inserted may be formed in one side of the bottom inclined surface, and at least one inserting groove into which the second inserting protrusion is inserted may be formed in the other side of the bottom inclined surface.

According to a still further embodiment, a guide rotary portion may be formed on an upper end of the screw, and the lid may be provided with a rotary guide for guiding the rotation of the screw, the rotary guide being in contact with an edge of the guide rotary portion when the juicer module is assembled. Alternatively, according to another embodiment, a shaft may be provided at an upper central portion of the screw, a shaft socket into which the shaft is inserted may be formed in a lower side of the lid, and a reinforcing layer may be disposed in the shaft socket.

According to another embodiment, a blade structure for cutting a material thrown into the material input or pushing the material downwards may be formed on an upper end of the screw.

According to another embodiment, there is provided a juicer module having an open top juicer container with a shaft hole formed in a bottom central portion of the juicer container; a net drum fixedly arranged within the juicer container; a screw arranged within the net drum, the screw having a spiral portion formed on a side surface thereof, a rotary shaft to pass through the shaft hole of the juicer container and a guide rotary portion formed on an upper end thereof; and a lid coupled to an upper portion of the juicer container, the lid having a material input through a side thereof and a rotary guide for guiding the rotation of the screw, the rotary guide of the lid being in contact with an edge of the guide rotary portion of the screw when the juicer module is assembled. In one embodiment, the guide rotary portion may be ring-shaped to receive therethrough a material put into the material input.

According to another embodiment, there is provided a vertical screw juicer including a main body having a driving shaft protruding upwards; an open top container installed onto the main body; a screw arranged within the container, the screw having a rotary shaft vertically fitted around the driving shaft; a net drum arranged within the container to enclose a circumference of the screw; a lid coupled to an upper portion of the main body, the lid having a material input; and a locking structure for restricting a vertical movement of the screw to prevent the screw from lifting when the driving shaft and the rotary shaft rotate together.

According to one embodiment, the rotary shaft includes a shaft socket into which an upper portion of the driving shaft is inserted, and the locking structure includes a locking protrusion formed on the driving shaft, and a locking hole formed on the rotary shaft so that the locking protrusion is inserted into the locking hole when the driving shaft is inserted into the shaft socket. The locking hole may include a lower space open downwardly to allow the locking protrusion to enter and depart the locking hole; a guide portion for allowing the locking protrusion to horizontally move as the driving shaft begins to rotate; and a locking portion for restricting a vertical movement of the locking protrusion. The locking hole may include a pair of locking portions respectively formed at right and left sides of the guide portion to restrict a vertical movement of the rotary shaft against a bidirectional rotation of the driving shaft. The locking protrusion may have a circular cross section, and the locking portion may be shaped as a circular arc corresponding to the circular cross section. The locking hole may further include inclined surfaces at a lower portion of the locking hole to slidingly guide the locking protrusion into the locking hole. The inclined surfaces may be shaped as an arc which is connected to both sides of the lower space. The rotary shaft may include a shaft socket into which an upper portion of the driving shaft is inserted, and the locking structure may include a pair of locking protrusions respectively formed on both widthwise opposite sides of the driving shaft and a pair of locking holes formed in the rotary shaft so that the pair of locking protrusions are respectively inserted into the locking holes when the driving shaft is inserted into the shaft socket.

According to another embodiment, the lid may have a support formed on a bottom surface thereof to suppress a shaking of an upper portion of the screw.

According to a further embodiment, the locking protrusion may be formed from an end of a pin laterally inserted into and installed to the driving shaft. Each of the locking holes may further include an inclined surface for slidingly guiding the corresponding locking protrusion into the locking hole, and the inclined surface may be shaped as an arc which is connected to the corresponding locking protrusion.

According to various embodiments of the present invention so constructed, the following advantages can be expected.

The juicer module according to one embodiment of the present invention adopts a bottom structure of the juicer container having a bottom inclined surface which gradually slopes downwardly from a central region of the bottom surface of the juicer container through which the rotary shaft of the screw passes toward the outside of the bottom surface of the juicer container, so that the leakage of water from the juicer container toward the main body may be prevented. As such, a cylindrical protrusion for waterproofing which might otherwise be formed at a bottom portion of a juicer container of a conventional juicer or juicer module may be omitted, thereby further facilitating the cleaning of the bottom portion of the juicer container. Further, in the juicer module according to another embodiment of the present invention, an inclined surface which corresponds to the bottom inclined surface of the juicer container is formed on the lower portion of the screw, thereby resting the screw on the bottom of the juicer container in a stationary manner. Still further, in the juicer module according to still another embodiment of the present invention, a guide rotary portion and a rotary guide are formed on the upper end of the screw and the lower portion of the lid, respectively, so that a shaft socket, which might otherwise be formed in a lid of a conventional juicer, may be omitted, thereby enabling cleaning of the lid in a more sanitary and convenient manner.

The scope of the present invention is not limited to the embodiments described and illustrated herein but is defined by the appended claims. It will be apparent that those skilled in the art can make various modifications and changes thereto within the scope of the invention defined by the claims. Therefore, the true scope of the present invention should be defined by the technical spirit of the appended claims.

BRIEF DESCRIPTION OF THE SEVERAL VIEWS OF THE DRAWINGS

Objects, features and advantages of various embodiments of the present invention will become apparent from the following description of an example embodiment given in conjunction with the accompanying drawings.

DETAILED DESCRIPTION

Figure 1:
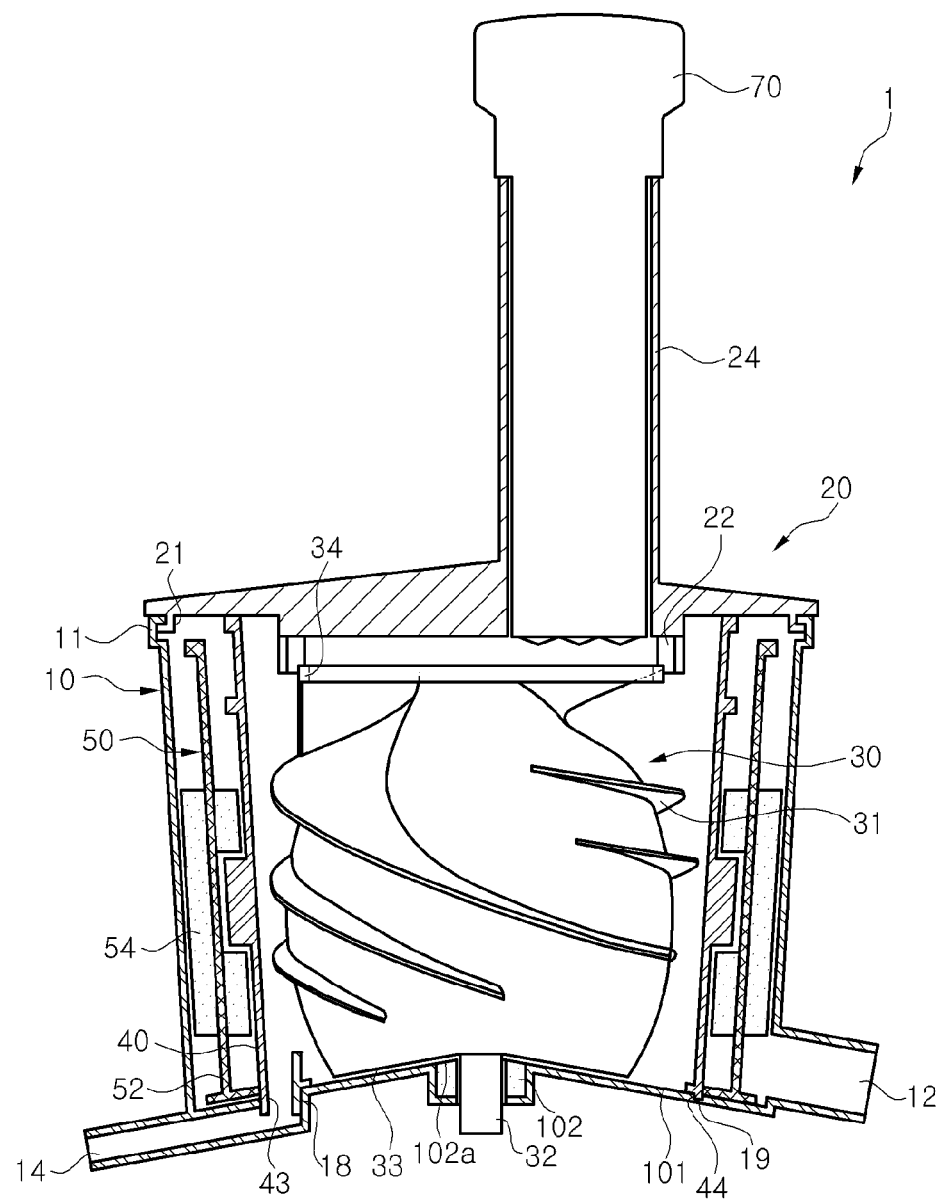
FIG. 1 is a sectional view illustrating a juicer module according to an embodiment of the present invention.

Hereinafter, embodiments of the present invention will be described in detail with reference to the accompanying drawings. The embodiments described herein are merely provided as examples to completely convey the sprit and scope of the present invention to those skilled in the art. Accordingly, the present invention is not be limited to the embodiments to be described below but may be implemented in various different forms. And, widths, lengths and thicknesses of the components may be represented in an exaggerative manner for convenience through the drawings. Through the specification, like elements are designated by like reference numerals.

Figure 2:
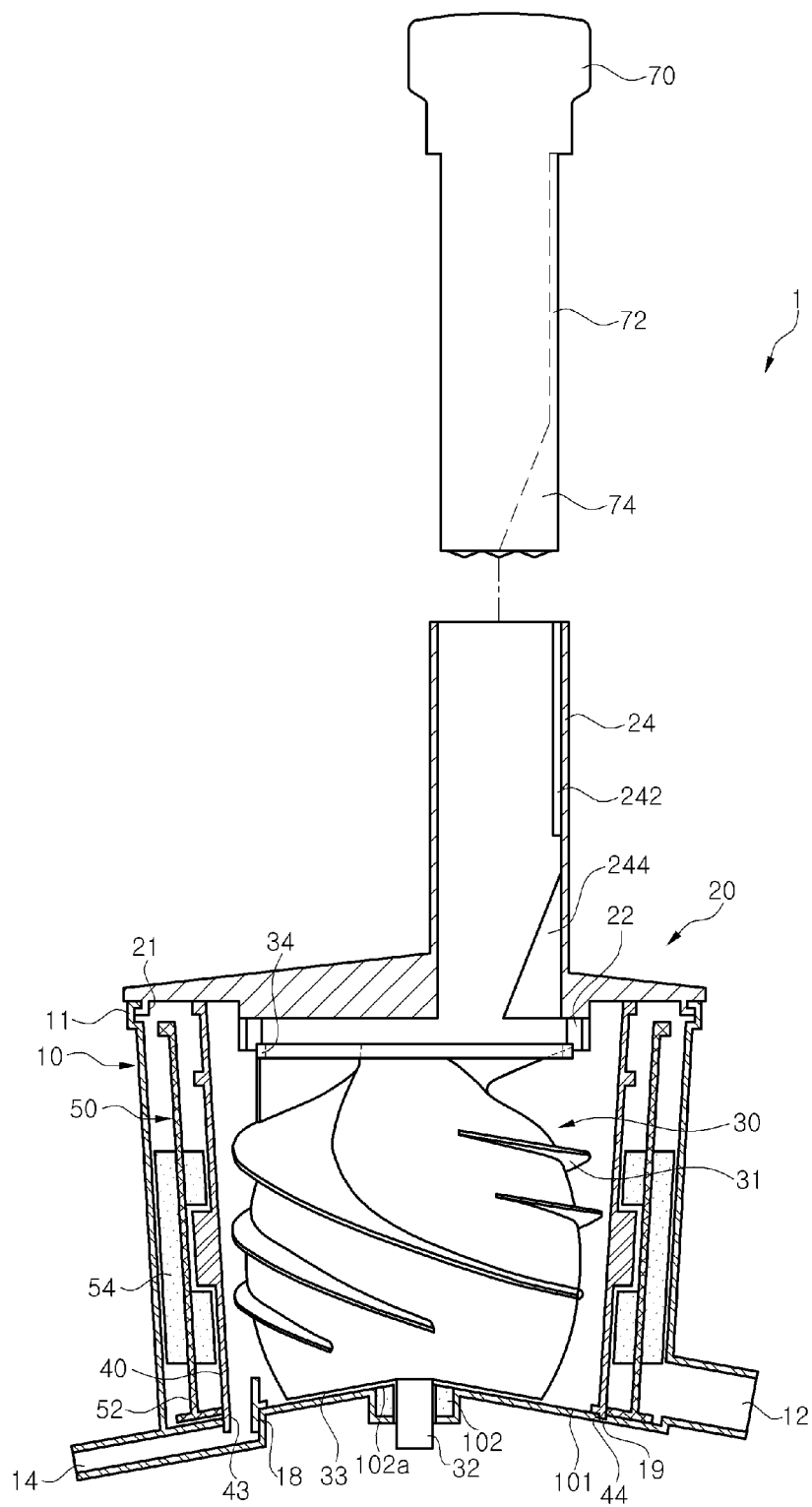
FIG. 2 is an exploded sectional view illustrating the juicer module shown in FIG. 1 with a squeezing rod decoupled from the juicer module.
Figure 3:
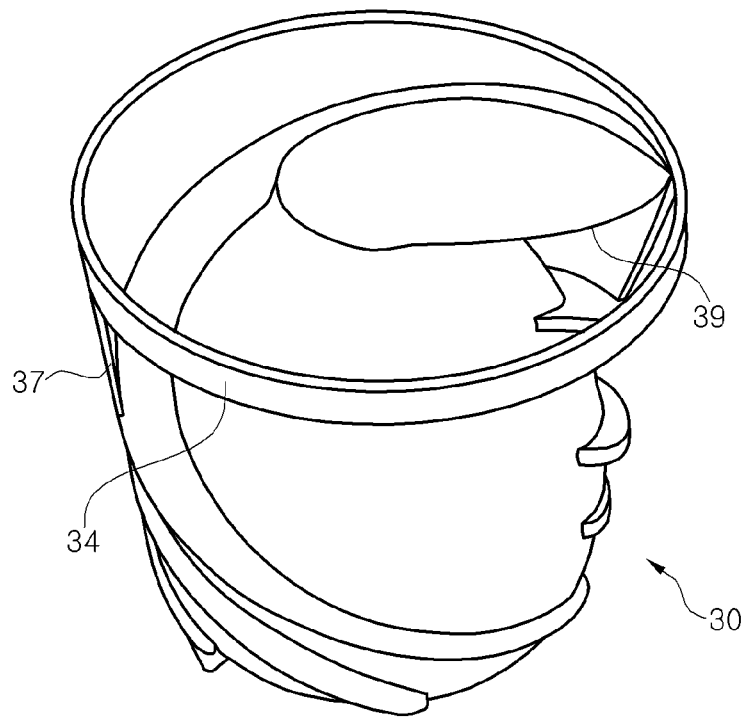
FIG. 3 is a perspective view illustrating a screw of the juicer module shown in FIGS. 1 and 2.
Figure 4:
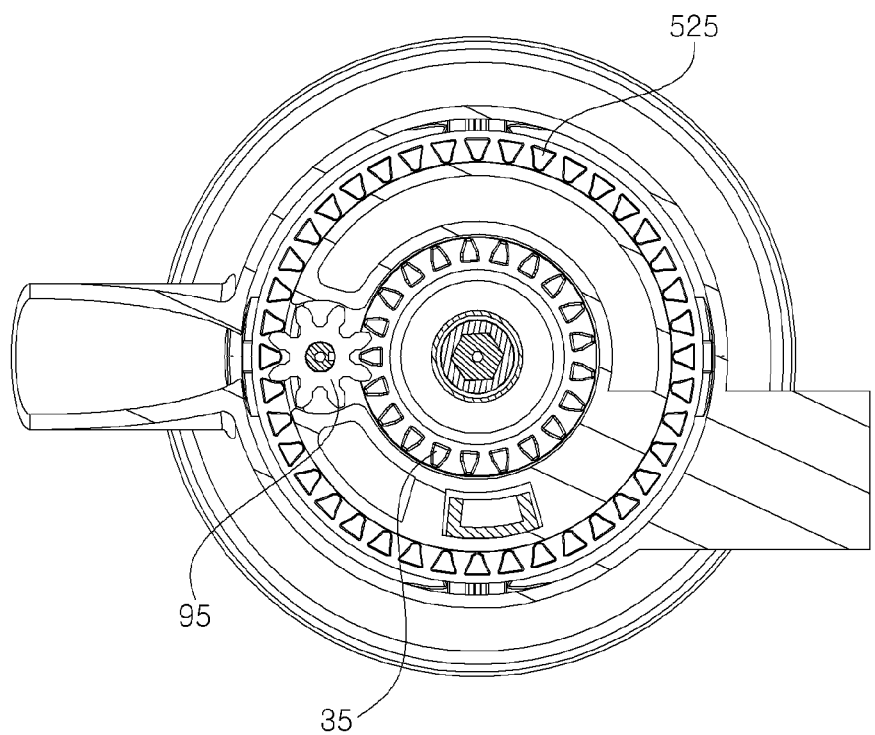
FIG. 4 is a view illustrating an exemplary configuration for rotating a brush as the screw is rotated in the juicer module according to one embodiment of the present embodiment.

FIG. 1 is a sectional view illustrating a juicer module according to an embodiment of the present invention; FIG. 2 is an exploded sectional view illustrating the juicer module from which a squeezing rod is decoupled; FIG. 3 is a perspective view illustrating a screw of the juicer module shown in FIG. 1; and FIG. 4 is a view illustrating an exemplary configuration applied to the juicer module shown in FIG. 1, in which a brush is rotated as the screw is rotated.

As shown in FIG. 1, a juicer module 1 according to an embodiment of the present invention includes a juicer container 10, a lid 20, a screw 30 and a net drum 40. Further, the juicer module 1 further includes a brush 50 and a squeezing rod 70. The juicer module 1 is utilized in a juicer for making fruit juice, vegetable juice, cereal juice, nut juice, or other typed crushed products, and the juicer module 1 may be vertically installed onto a main body (not shown) into which a driving device is embedded. Since any conventional main body may be used as the main body of the juicer according to embodiments of the present invention, the specific description and illustration for the main body will be omitted in the specification and drawings.

The driving device is provided with a driving shaft which is vertically protruded from a housing of the main body so that the driving shaft is detachably connected to a rotary shaft 32 positioned at a lower end of the screw 30. The driving shaft may be generally angular-shaped. In this case, the rotary shaft 32 of the screw 30 may be provided with an angular-shaped shaft socket into which the angular-shaped driving shaft is inserted.

The juicer container 10 is open-topped, and the lid 20 is coupled to an upper portion of the juicer container 10. In order that the lid 20 is detachably coupled with the upper portion of the juicer container 10, the juicer container 10 and the lid 20 are provided with coupling ribs 11 and 21, respectively, which correspond with each other, so that the coupling ribs 11 and 21 may be coupled with each other due to the rotation of the lid 20 in one direction while they may be decoupled from each other due to the rotation of the lid 20 in the counter direction.

As described below in detail, the screw 30 and the net drum 40 which is nearly adjacent to the outside of the screw 30 are arranged within the juicer container 10, so that the screw 30 and the net drum 40 may cause a material to be squeezed therebetween and extract juice or extract from the material. A juice-squeezing net drum is basically used as the net drum 40, but a milling net drum for milling other cereals or nuts may be additionally used.

The brush 50 is detachably assembled to an outer periphery of the net drum 40 and positioned between the net drum 40 and an inner wall surface of the juicer container 10, so that the brush 50 may be rotated to mainly serve to strip off material or material residues adhered onto the inner wall surface of the juicer container 10. The type of net drums may be varied depending on the material to be processed. In this case, one type of net drum may be replaced with another type of net drum.

According to the illustrated embodiment of FIG. 1, the screw 30 is substantially cylinder-shaped, and spiral portions 31 which face the net drum 40 to squeeze and guide the material are provided on an outer periphery of the screw 30. A wall surface blade for facilitating the cutting or milling of the material may be additionally formed on the net drum 40.

The rotary shaft 32 which passes through a central portion of a bottom inclined surface 101 of the juicer container 10 is provided at a lower central portion of the screw 30. The screw 30 is detachably connected to the driving shaft positioned at an upper portion of the main body to which the juicer module 1 is mounted. As described above, the driving shaft is a shaft which is rotationally driven by and extended from the driving device in the main body having a motor. The driving device may be configured rotate the rotary shaft at low speeds or, alternatively, to rotate the rotary shaft at medium speeds or high speeds.

In one embodiment, the rotary shaft 32 has an angular shaft socket, and the driving shaft is angular shaped to be inserted into the angular shaft socket.

The bottom inclined surface 101 of the juicer container 10 is gradually lowered outwards (i.e., slants downward and outwardly) around the rotary shaft 32 positioned at the central portion thereof. This shape of the bottom inclined surface 101 allows the water or moisture in the bottom portion of the juicer container 10 to be directed toward a bottom outside area of the juicer container 10 rather than a bottom central area of the juicer container 10, which contributes to preventing the leakage of water around the rotary shaft 32, i.e., through the shaft hole in the bottom central portion of the juicer container 10.

A lower inclined surface 33 which is gradually raised from its outside toward the central portion thereof to correspond to the bottom inclined surface 101 of the juicer container 10 may be formed at a lower portion of the screw 30. The lower inclined surface 33 of the screw 30 faces the bottom inclined surface 101 of the juicer container 10, and the central portion of the bottom inclined surface 101 is positioned higher. Further, a packing 102 is installed to the central portion of the bottom inclined surface 101, and the rotary shaft 32 of the screw 30 is inserted into the packing 102. An inclined surface 102a extending from and substantially parallel to the bottom inclined surface 101 is formed on an upper portion of the packing 102. The inclined surface 102a of the packing 102 is closely contacted with the lower inclined surface 33 of the screw 30 so that the leakage of water through the shaft hole may be more firmly prevented.

Further, a guide rotary portion 34 may be formed at an upper end of the screw 30. In one embodiment, the guide rotary portion 34 has a flat horizontal upper surface (see FIG. 3). The guide rotary portion 34 slidably faces a rotary guide 22 formed at a lower portion of the lid 20. Thus, the rotary guide 22 may guide the rotation of the guide rotary portion 34. The rotary guide 22 may be positioned to both face top and side surfaces of the guide rotary portion 34.

As well shown in the illustrated embodiment of FIG. 3, the guide rotary portion 34 may be ring-shaped. This allows material thrown into a material input 24 of the lid 20 to pass therethrough. At least one reinforcing rib 37 may be connected between the guide rotary portion 34 and a screw body of the screw 30. Such a reinforcing rib 37 serves to reinforce the guide rotary portion 34 in order to prevent the guide rotary portion 34 from being separated from the screw body of the screw 30. Even though the guide rotary portion 34 and the screw body of the screw 30 are integrally formed by an injection molding according to the illustrated embodiment of the present embodiment, it may be considered that the guide rotary portion 34 and the screw body of the screw 30 are separately formed and then assembled, for example, by a coupling scheme. Further, insofar as the guide rotary portion 34 allows the material to be dropped therethrough, the guide rotary portion 34 may have any other shape or configuration rather than the ring-shaped configuration.

Due to the rotary guide 22 of the lid 20 and the guide rotary portion 34 of the screw 30, a shaft, which would otherwise be arranged onto the upper end of the screw in the conventional juice module, or a shaft socket, which would otherwise be arranged in the lid, may be omitted.

Referring back to FIGS. 1 and 2, the material input 24 is vertically elongated in an upper end of the lid 20. A portion of the upper end of the screw 30 is configure to have a blade structure 39 (see FIG. 3) for cutting the material thrown into the material input or pushing the material downwards. In order that the material thrown into the material input may be cut by using such a blade structure 39, the material input 24 is arranged to be deviated toward a side from the central portion of the lid 20.

Meanwhile, the squeezing rod 70 is used to squeeze and push a material, and more specifically, a material such as high-fiber fruits or vegetables, into the material input 24. If the squeezing rod 70 squeezes the material in the material input 24, the material is pushed down toward a lower end of the material input 24 so that the material may be cut by the blade structure 39 (see FIG. 3) at the upper end of the screw 30 and/or pushed and dropped into the juicer container 10.

As well shown in FIG. 2, the material input 24 may include an inner rib 244 formed on a lower inner wall surface thereof, and a guide protrusion 242 extended from an upper inner wall surface thereof to the inner rib 244. Further, the squeezing rod 70 may include a side surface in which there are an elongated guide groove 72 corresponding to the guide protrusion 242, and a rib groove 74 corresponding to the inner rib 244. The guide groove 72 and the rib groove 74 are shown with dotted lines. The inner rib 244 may also serve to cut the material together with the rib groove 74 of the squeezing rod 70. The shapes of the material input 24 and the squeezing rod 70 as shown in FIG. 2 are exemplarily described to explain one embodiment of the present invention, and therefore, the present invention is not limited thereto. As such, the guide groove 72 and the rib groove 74 of the squeezing rod 70 and/or the inner rib 244 and the guide protrusion 242 of the material input 24 may be omitted.

The net drum 40 is maintained in a stationary manner within the juicer container 10. If the screw 30 positioned within the net drum 40 is rotated, the net drum 40, which faces the spiral portions 31 of the screw 30, squeezes the material thrown therein to produce juices or extracts. At this time, if a plurality of elongated edges, i.e., a plurality of elongated wall surface blades, may be formed on the net drum 40 in a vertical direction, the squeezing, cutting and juicing efficiency to the material may be increased. The juicer container 10 has a first discharging hole 14 and a second discharging hole 12, wherein the juices or extracts extracted from the material are discharged out through the first discharging hole 14 out of the juicer container 10 while the material residues are discharged out through the second discharging hole 12.

In order to fix the net drum 40 to the juicer container 10 without being fluctuated, first and second inserting protrusions 43 and 44 heading downwards are formed one and the other sides of the lower end of the net drum 40, respectively, while an inserting hole 18 and an inserting groove 19 into which the first and second inserting protrusions 43 and 44 are respectively inserted are formed in a bottom of the juicer container 10. The inserting groove 19 may be composed of one or more inserting grooves and the second inserting protrusion 44 may be also composed of one or more second inserting protrusions depending on the number of the inserting grooves.

In one embodiment, the first inserting protrusion 43 and the inserting hole 18 may form a passage which extends to the first discharging hole 14 of the juicer container 10 as shown in FIG. 1.

Meanwhile, the brush 50 serves to continuously strip off material or material residues adhered onto the inner wall surface of the juicer container 10. The brush 50 has a rotary-type brush frame 52 which is substantially cylindrical-shaped, and a wiper 54 which is installed to the brush frame 52. The wiper 54 is made of a flexible material, and more specifically, a flexible resin or a rubber material, and closely contacted with the inner wall surface of the juicer container 10. Since the brush 50 is rotated, the wiper 54 may continuously wipe the material or its material residues adhered onto the inner wall surface of the juicer container 10.

Multiple schemes may be adopted to rotate the brush 50. According to one embodiment of the present embodiment, a train of gears as shown in FIG. 4 causes the brush 50 to be correspondingly rotated as the screw 30 is rotated. Referring to FIG. 4, a circular intermediate gear tooth 95 is sandwiched between a driving gear tooth 35 formed at the lower end of the screw 30 and a driven gear tooth 525 formed at a lower end of the brush frame 52, and such an intermediate gear tooth 95 is simultaneously gear-engaged with both the driving gear tooth 35 and the driven gear tooth 525. As such, if the screw 30 (see FIG. 1) is rotated, the corporative operation of the gear teeth 35, 95 and 525 causes the brush 50 (see FIG. 1) to be rotated.

Figure 5:
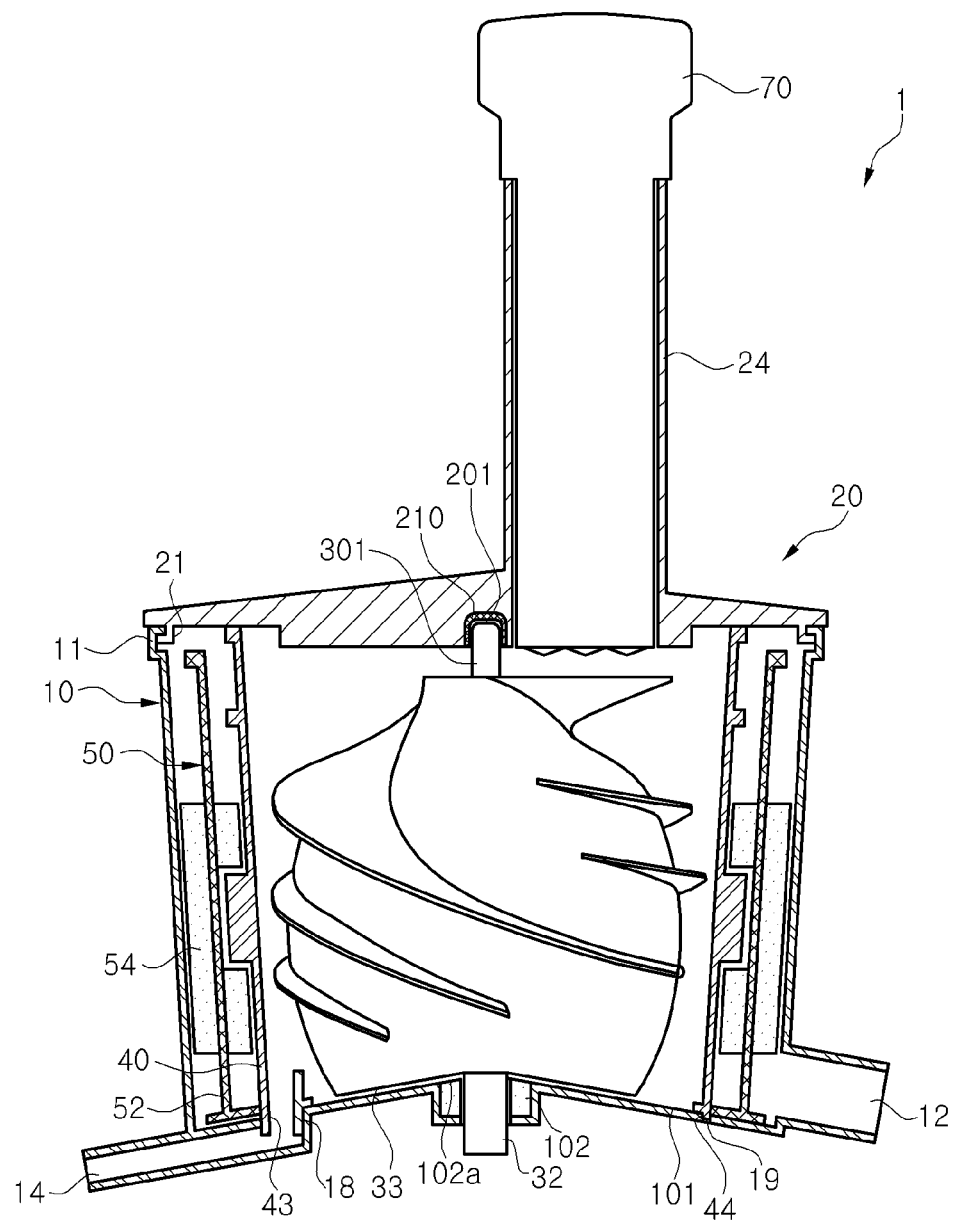
FIG. 5 is a sectional view illustrating a juicer module according to another embodiment of the present invention.

FIG. 5 is a sectional view illustrating a juicer module according to another embodiment of the present invention. The juicer module 1 according to the this illustrated embodiment includes a shaft 301 positioned at an upper central portion of the screw 30, and a shaft socket 201 formed in a lower central portion of the lid 20 positioned at an upper end of the juicer container 10 so that the shaft 301 may be inserted into the shaft socket 201 to support the screw 30 in a rotatable manner. In order to prevent the shaft socket 201 from being broken due to any possible traverse fluctuations of the screw 30, a reinforcing layer 210 may be disposed, formed of otherwise received in the shaft socket 201 by using an inserting scheme or a coating scheme. Since the insertion of the shaft 301 into the shaft socket 201 causes the upper end of the screw 30 to be supported in the rotatable manner, the rotary guide at the lower portion of the lid and the guide rotary portion at the upper portion of the screw as described in aforementioned embodiments may be omitted. Other features of the juicer module may be identical to those in aforementioned embodiments so that the description about the other features will be omitted to avoid redundant descriptions.

Figure 6:
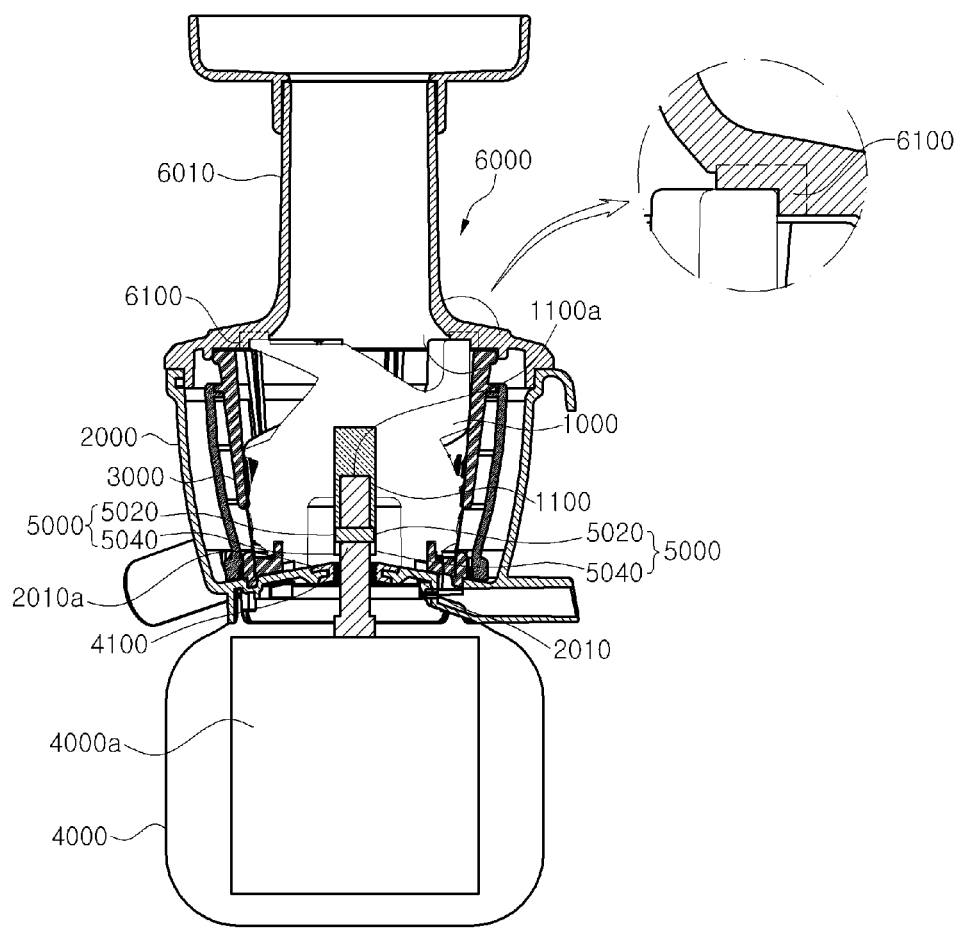
FIG. 6 is a longitudinal sectional view illustrating a vertical screw juicer according to a further embodiment of the present invention.

As shown in FIG. 6, a vertical screw juicer according to a further embodiment of the present invention comprises a main body 4000 having a motor 4000a embedded therein; and a juicer module installed onto the main body 4000. The juicer module includes a screw 1000, a juicer container 2000, a net drum 3000 and a lid 6000. The vertical screw juicer further comprises a locking structure 5000, which operatively couples a driving shaft 4100 of the motor 4000a with a rotary shaft 1100 of the screw 1000 and simultaneously prevents the rotary shaft 1100 from being lifted, when the driving shaft 4100 rotates. The assembling sequence of the main body and the respective components of the juicer module may be variously modified, and therefore the present invention should not be limited to the assembling sequence.

The rotary shaft 1100 is formed integrally with screw 1000, and the rotary shaft 1100 extends to vertically protrude from a lower portion of the screw 1000. The screw 1000 is vertically installed in the juicer container 2000, and the net drum 3000 is installed in the juicer container 2000 to enclose a circumference of the screw 1000. The net drum 3000, in cooperation with the screw 1000, serves to make juices from materials such as fruits or vegetables and simultaneously serves as a filter for separating the juices from their material residues. The juicer container 2000 includes a bottom inclined surface 2010 which is inclined downwards and outwardly from the central portion or its neighboring portion thereof, and the screw 1000 includes a lower inclined surface which is formed at a lower portion of the screw 1000 and surface-contacted with the bottom inclined surface 2010 when the vertical screw juicer is assembled. The bottom inclined surface 2010 may cause the screw 1000 having its corresponding inclined surface to be stably seated and simultaneously serve to block moisture against a central portion of the bottom inclined surface 2010 where a shaft coupling between the driving shaft and the rotary shaft is formed.

When the juicer module is mounted to the main body, the driving shaft 4100 of the motor 4000a is inserted into the juicer container 2000 through a bottom seal or packing 2010a of the juicer container 2000. The screw 1000 includes a lower space that encloses a circumference of its own rotary shaft 1100, wherein the rotary shaft 1100 of the screw 1000 and the driving shaft 4100 are coupled with each other in an insertion scheme within the lower space. To this end, the rotary shaft 1100 has an elongate shaft socket 1100a of a circular cross section while the driving shaft 4100 has a corresponding circular cross section so that the driving shaft 4100 is inserted into the shaft socket 1100a. As will be described in detail hereinafter, the locking structure 5000 is configured to completely suppress a relative movement between the driving shaft 4100 and the rotary shaft 1100 in the vertical direction as well as in the rotational direction when the driving shaft 4100 rotates. Specifically, the locking structure 5000 completely suppresses the screw 1000 from being lifted by restraining the vertical movement of the rotary shaft 1100. Further, the locking structure 5000 is configured to allow the coupling between the driving shaft 4100 and the rotary shaft 1100 to be easily decoupled when the rotational operation of the driving shaft 4100 stops.

The lid 6000 is detachably coupled to an upper portion of the juicer container 2000, and has a support 6100 formed on a bottom surface of the lid 6000 to suppress the screw 1000 from shaking. It is preferable that the support 6100 has a rotational support structure which is adjacent to an upper edge of the screw 1000 to guide the rotation of the screw 1000, wherein the rotational support structure may have a plurality of guide pieces which are intermittently contacted with the upper edge of the screw 1000. The screw 1000 includes a spiral rib formed on a side surface of the screw 1000 to crush, cut or squeeze the material, wherein the spiral rib is positioned to be adjacent to an inner surface of the net drum 3000.

According to one embodiment, the locking structure 5000 includes a pair of locking protrusions 5020 and 5020 respectively provided on both widthwise opposite sides of the driving shaft 4100. The pair of locking protrusions 5020 and 5020 may be formed by a pin which laterally penetrates the driving shaft 4100. The pin may be inserted into a pin hole of the driving shaft 4100 in an interference fit scheme, so that both ends of the pin protrude from a side surface of the driving shaft 4100 in 180 degree opposite directions, thereby forming the pair of locking protrusions 5020 and 5020 as described above. The locking structure 5000 further includes a pair of locking holes 5040 and 5040 formed on the rotary shaft 1100 respectively corresponding to the locking protrusions 5020 and 5020. In a state where the driving shaft 4100 is inserted into the shaft socket 1100a of the rotary shaft 1100, the locking protrusions 5020 and 5020 may be positioned within the locking holes 5040 and 5040, respectively. Further, as will be described hereinafter, when the driving shaft 4100 rotates, the locking protrusions 5020 and 5020 continue to be locked into the respective locking holes 5040 and 5040, so that the screw 1000 and thus the rotary shaft 1100 thereof may rotate together with the driving shaft 4100.

FIG. 7(a) shows a state in which the operative coupling between the rotary shaft 1100 and the driving shaft 4100 may be decoupled, while FIG. 7(b) shows another state in which the rotary shaft 1100 and the driving shaft 4100 have been operatively coupled.

Figure 7:
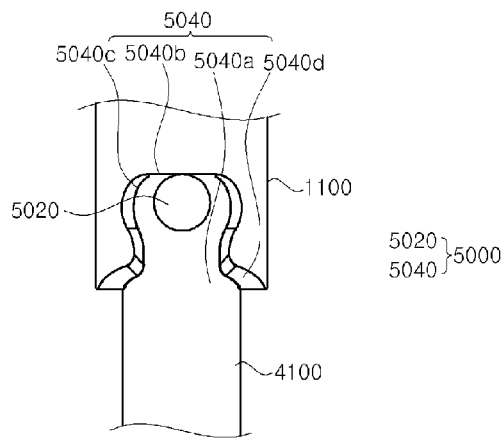
FIGS. 7(a) and 7(b) are views illustrating a locking structure between a rotary shaft of a screw and a driving shaft of a motor in the vertical screw juicer shown in FIG. 6.
Figure 7:
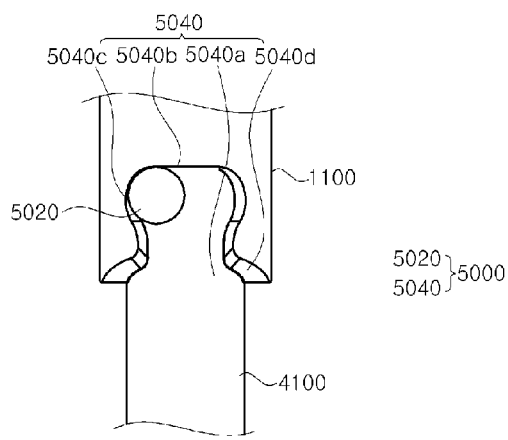
Figure 8:
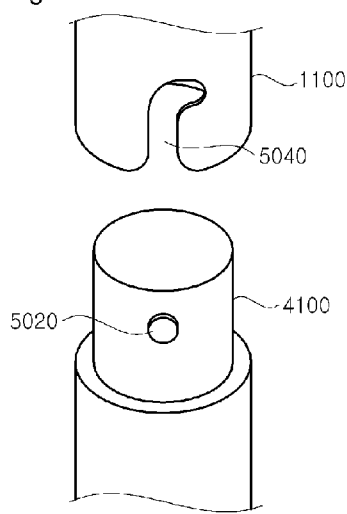
FIG. 8 is a view illustrating a modification of the locking structure shown in FIG. 7.

Referring to FIGS. 7(a) and 7(b), each locking protrusion 5020 of the illustrated embodiment is shaped as a circular cylinder, and its corresponding locking hole 5040 has a shape for allowing the vertical insertion of the locking protrusion 5020, the horizontal linear guide of the locking protrusion 5020 and the vertical withdrawal of the locking protrusion 5020. That is, a lower space 5040a which is open downwardly is formed at a lower portion of the locking hole 5040 to allow the locking protrusion 5020 to enter and depart the locking hole 5040; a linear guide portion 5040b is formed at an upper central portion of the locking hole 5040 to allow the locking protrusion 5020 to be horizontally and linearly moved as the driving shaft 4100 begins to rotate; and locking portions 5040c, into which the locking protrusion 5020 is locked when the driving shaft 4100 and the rotary shaft 1100 of the screw rotate in an interlocking scheme, are formed at right and left sides of the linear guide portion 5040b, each locking portion 5040c being shaped as a substantially circular arc. A lower portion of each locking portion 5040c has a shape capable of preventing the locking protrusion 5020 from escaping downwards, i.e., an inwardly protruding shape. Therefore, even if an upward force for lifting the screw 1000 is generated during the rotation of the screw 1000 (see FIG. 6), the screw 1000 is suppressed from being lifted since the locking protrusion 5020 is caught to the locking portion 5040c. Further, in order for the locking protrusion 5020 to be more reliably contacted with an inner surface of the locking portion 5040c of the locking hole 5040, it is preferable that the circular sectional shape of the locking protrusion 5020 corresponds to the circular arc shape of the locking portion 5040c. It is more preferable that the radius of the locking protrusion 5020 is substantially identical with the radius of curvature of the circular arc shape of the locking portion 5040*c*. Although the pair of locking protrusions 5020 and 5020 and the pair of locking holes 5040 and 5040 are respectively provided on the driving shaft 4100 and the rotary shaft 1100 in the illustrated embodiment of FIGS. 7(*a*) and 7(*b*), a locking structure 5000 as shown in FIG. 8, in which a single locking protrusion 5020 and a single locking hole 5040 are formed on the driving shaft 4100 and the rotary shaft 1100, respectively, may be provided.

Referring to FIG. 6 and FIGS. 7(*a*) and 7(*b*), when the locking structure 5000 as described above is used, the juicer module, in which the screw 1000, the juicer container 2000 and the net drum 3000 are assembled, is vertically pressed downwards and mounted to the main body 4000 from which the driving shaft 4100 protrudes, whereby the driving shaft 4100 may be inserted into the shaft socket 1100*a* of the rotary shaft 1100. Alternatively, in a state where the juicer container 2000 is mounted to the main body 4000, the driving shaft 4100 may be inserted into the shaft socket 1100*a* by using a simple operation of pressing down the screw 1000 against the driving shaft 4100 or only by using the weight of the screw 1000. Further, only by operating the motor 4000*a* embedded in the main body 4000, the locking protrusion 5020 provided on the driving shaft 4100 is rotated and then spontaneously engages the locking portion 5040*c* of the locking hole 5040, so that the driving shaft 4100 is operatively coupled with the screw 1000 and the rotary shaft 1100 thereof. At this time, as shown in FIG. 7(*b*), since the locking portion 5040*c* of the locking hole 5040 strictly prevents the locking protrusion 5020 from being vertically moved, the screw 1000 may be reliably rotated in its original position without being lifted upwards even if the upward force for lifting the screw 1000 might be generated due to the rotation of the screw 1000 and/or the accumulation of material residues. Further, when the screw 1000 needs to be separated after the suspension of the rotation of the screw 1000, once the screw 1000 is only slightly rotated and then lifted upwards, the locking state between the locking protrusion 5020 and its corresponding locking hole 5040 is released from the position as shown in FIG. 7(*b*) to the position as shown in FIG. 7(*a*), so that the screw 1000 may be more easily separated.

Further, according to the illustrated embodiment of FIGS. 7(*a*) and 7(*b*), the locking hole 5040 may include inclined surfaces 5040*d* which are positioned to the lower portion of the locking hole 5040 and gradually extend to an inside of the locking hole 5040, specifically the locking portions 5040*c*. Even if the locking protrusion 5020 and its corresponding locking hole 5040 are not aligned with each other, the inclined surfaces 5040*d* allow the locking protrusion 5020 formed on the driving shaft 4100 to spontaneously slide over the inclined surfaces 5040*d*, so that the locking protrusion 5020 may be spontaneously moved into the locking hole 5040. Since it is difficult for a user to identify the relative position between the locking protrusion 5020 and its corresponding locking hole 5040 with the naked eye, the inclined surfaces 5040*d* are very useful to realize an easy coupling between the rotary shaft of the screw and the driving shaft of the motor.

Figure 9:
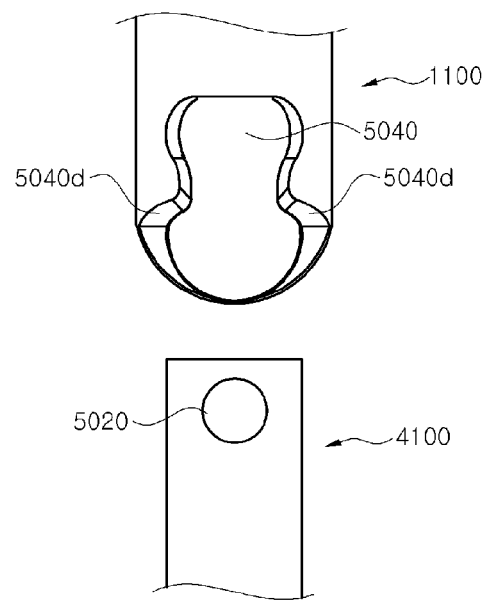
FIG. 9 is a view illustrating another modification of the locking structure shown in FIG. 7.

In addition, as shown in FIG. 9, since the inclined surfaces 5040*d* may be shaped as an arc which respectively extend to both sides of the lower space, the locking protrusion 5020 may be spontaneously moved into its corresponding locking hole 5040 over the inclined surface 5040*d* even if the locking protrusion 5020 might be pressed downwards in a certain position.

Figure 10:
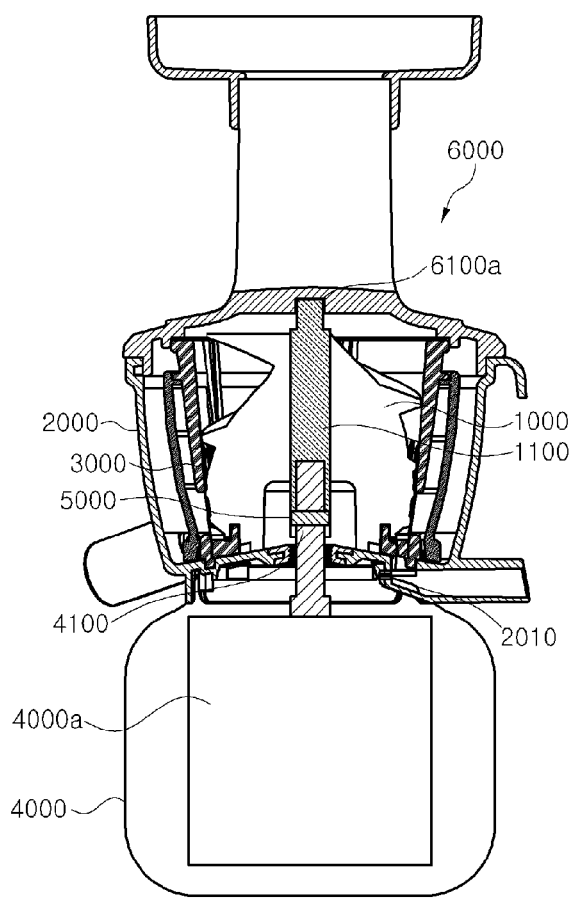
FIG. 10 is a longitudinal view illustrating a vertical screw juicer according to a still further embodiment of the present invention.

FIG. 10 is a longitudinal view illustrating a vertical screw juicer according to a still further embodiment of the present invention.

Referring to FIG. 10, the rotary shaft 1100 passes through the central portion of the screw 1000 and thus protrudes upwards over an upper portion of the screw 1000 in the vertical screw juicer according to the present embodiment. An upper portion of the rotary shaft 1100 has a smaller diameter than the other portions thereof, and is inserted into a shaft socket 6100*a* formed in the lid 6000. Since the upper portion of the rotary shaft 1100 of the screw 1000 is inserted into the shaft socket 6100*a* and rotatably maintained, the shaking of the screw 1000 can be suppressed somewhat during the rotation of the screw 1000. The configuration of the upper portion of the screw 1000 and the shaft socket 6100*a* replaces the guide-type support 6100 (see FIG. 6) shown in the aforementioned embodiment of FIG. 6. Since the vertical screw juicer according to the present embodiment may have substantially the same configuration and features as the aforementioned embodiment illustrated in FIG. 6 except for the support structure in the upper portion of the screw by means of the shaft socket 6100*a* and the upper portion of the rotary shaft 1100, the description for the same configuration and features will be omitted to avoid redundant descriptions.

Figure 11:
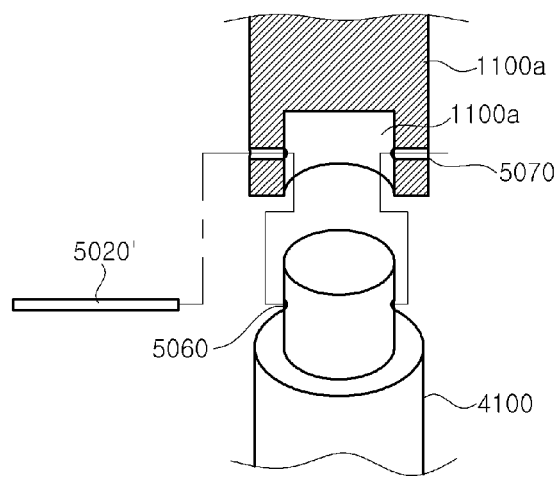
FIG. 11 is a view illustrating another locking structure according to a further modification of the present invention.

FIG. 11 shows a modified locking structure for preventing the screw from being lifted.

The locking structure 5000 as shown in FIG. 11 includes a first pin hole 5060 provided in the driving shaft 4100; a second pin hole 5070 provided in the rotary shaft 1100; and a locking pin 5020' which is simultaneously inserted into both the first pin hole 5060 and the second pin hole 5070 when the driving shaft 4100 is inserted into the shaft socket 1100*a* of the rotary shaft 1100 of the screw. To this end, the first pin hole 5060 is formed to laterally pass through the driving shaft 4100, and the second pin hole 5070 is formed to laterally pass through the rotary shaft 1100 of the screw in a position in which the shaft socket 1100*a* is positioned.

According to the various embodiments of the present invention described herein, the following advantages can be expected.

The juicer module according to one embodiment of the present invention adopts a bottom structure of the juicer container having a bottom inclined surface which is gradually lowered (i.e., slanted downwards) from the central region of the bottom surface of the juicer container through which the rotary shaft of the screw passes toward the outside of the bottom surface of the juicer container, so that the leakage of water from the juicer container toward the main body may be prevented. As such, the cylindrical protrusion for waterproofing which would otherwise typically be formed at a bottom portion of a juicer container of a conventional juicer or juicer module may be omitted, thereby further facilitating the cleaning of the bottom portion of the juicer container. Further, in the juicer module according to another embodiment of the present invention, an inclined surface which corresponds to the bottom inclined surface of the juicer container is formed on the lower portion of the screw, thereby resting the screw on the bottom of the juicer container in a stationary manner. Still further, in the juicer module according to still another embodiment of the present invention, the guide rotary portion and the rotary guide are formed on the upper end of the screw and the lower portion of the lid, respectively, so that the shaft socket, which would otherwise typically be formed in a lid of a conventional juicer, may be omitted, thereby performing the cleaning of the lid in a more sanitary and convenient manner.

The scope of the present invention is not limited to the embodiments described and illustrated herein but is defined by the appended claims. It will be apparent that those skilled in the art can make various modifications and changes thereto within the scope of the invention defined by the claims. Thus, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A juicer module, comprising:

a juicer container with an open top, a shaft hole formed in a bottom central portion of the juicer container and a bottom inclined surface slanted downward in a radially outward direction away from a central axis of the shaft hole to direct fluid away from the bottom central portion of the juicer container;

a lid with a material input through a side thereof, the lid coupled to an upper portion of the juicer container;

a net drum fixedly arranged within the juicer container, a first inserting protrusion formed downwardly on a first side of a lower end of the net drum and at least one second inserting protrusion formed downwardly on a second side of the lower end of the net drum, and wherein an inserting hole into which the first inserting protrusion is inserted is formed in a first side of the bottom inclined surface of the juicer container, and at least one inserting groove into which the second inserting protrusion is inserted is formed in a second side of the bottom inclined surface of the juicer container;

a screw arranged within the net drum, the screw having a spiral portion formed on a side surface thereof, a rotary shaft to pass through the shaft hole of the juicer container and a lower inclined surface at least partially formed on a lower end of the screw to contact the bottom inclined surface of the juicer container; and a packing positioned at a central portion of the bottom inclined surface, the packing having an inclined surface adjacent and extending parallel to the bottom inclined surface of the juicer container and being in close contact with the lower inclined surface of the screw to assist in preventing leakage of fluid through the shaft hole in the bottom central portion of the juicer container, and wherein the bottom inclined surface of the juicer container is shaped to direct fluid in the juicer container away from the bottom central portion and toward a bottom outside area of the juicer container to assist in preventing leakage of fluid around the rotary shaft of the screw and through the shaft hole in the bottom central portion of the juicer container.

2. The juicer module as claimed in claim 1, wherein a shaft is provided at an upper central portion of the screw, a shaft socket into which the shaft is inserted is formed in a lower side of the lid, and a reinforcing layer is disposed in the shaft socket.

3. The juicer module as claimed in claim 1, wherein a blade structure is formed on an upper end of the screw to cut a material received via the material input, push the material downwards, or both cut and push the material downwards.

4. A juicer module, comprising:

a juicer container with an open top end, a shaft hole in a bottom central portion of the juicer container and a bottom end having an interior surface inclined downward in a radially outward direction away from a central axis of the shaft hole to direct fluid away from the bottom central portion of the juicer container and having an insertion hole and at least one insertion groove formed therein;

a net drum fixedly arranged within the juicer container, a first protrusion projecting downward from a lower end of the net drum for insertion into the insertion hole formed in the bottom end of the juicer container and at least one second protrusion projecting downward from the lower end of the net drum for insertion into the at least one insertion groove formed in the bottom end of the juicer container;

a screw arranged within the net drum, the screw having a spiral portion formed on a side thereof, a rotary shaft to pass through the shaft hole of the juicer container and a lower inclined surface at least partially formed on a lower end of the screw to abut the interior surface of the bottom end of the juicer container; and a seal positioned at the bottom central portion of the juicer container, the seal having an upper inclined surface that is adjacent and parallel to the interior surface of the bottom end of the juicer container and being in close contact with the lower inclined surface of the screw to assist in preventing leakage of fluid through the shaft hole in the bottom central portion of the juicer container, and wherein the interior surface of the bottom end of the juicer container is shaped to direct fluid in the juicer container away from the bottom central portion and toward a bottom outside area of the juicer container to assist in preventing leakage of fluid around the rotary shaft of the screw and through the shaft hole in the bottom central portion of the juicer container.

* * * * *